US012790879B2

(12) United States Patent
Wang

(10) Patent No.: US 12,790,879 B2
(45) Date of Patent: Nov. 10, 2026

(54) CHARGING COVER CONTROL METHOD AND DEVICE FOR ELECTRIC VEHICLE, AND ELECTRIC VEHICLE

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 415 days.

(21) Appl. No.: 18/555,696

(22) PCT Filed: Dec. 15, 2021

(86) PCT No.: PCT/CN2021/138189
§ 371 (c)(1),
(2) Date: Oct. 16, 2023

(87) PCT Pub. No.: WO2022/227600
PCT Pub. Date: Nov. 3, 2022

(65) Prior Publication Data

US 2024/0200388 A1 Jun. 20, 2024

(30) Foreign Application Priority Data

Apr. 26, 2021 (CN) ......................... 202110452772.9

(51) Int. Cl.
*E05F 15/73* (2015.01)
*B60L 53/16* (2019.01)

(52) U.S. Cl.
CPC .............. *E05F 15/73* (2015.01); *B60L 53/16* (2019.02); *E05F 2015/765* (2015.01); *E05F 2015/767* (2015.01)

(58) Field of Classification Search
None
See application file for complete search history.

(56) References Cited

U.S. PATENT DOCUMENTS 8,243,137 B2 * 8/2012 Schuetz .................. E05B 81/78
348/148
8,393,423 B2 * 3/2013 Gwozdek ............ B60W 10/184
180/65.21

(Continued)

FOREIGN PATENT DOCUMENTS

CN 201491117 U 5/2010
CN 104216514 A 12/2014

(Continued)

OTHER PUBLICATIONS

Korean Patent Office, "Second Office Action" issued on Jun. 25, 2025 for counterpart Korean Patent Application No. 10-2023-7035062, 10 pages, (English translation included).

(Continued)

*Primary Examiner* — Jonathan M Dager
(74) *Attorney, Agent, or Firm* — Hanley, Flight & Zimmerman, LLC

(57) ABSTRACT

A charging cover control method and device for an electric vehicle, and an electric vehicle are disclosed. Whether there is a user approaching a charging cover is determined by detecting a biological signal; and after the biological signal is detected, an image of the front of the charging cover is collected and matched with a pre-stored set gesture image. When the gesture matching is successful, that is the user currently performs a specific gesture action controlling the charging cover, and at this time, the charging cover is automatically controlled to be opened or closed, without the complicated steps such as manually operating the charging cover by the user, and the charging convenience is improved.

10 Claims, 3 Drawing Sheets

(56) References Cited

U.S. PATENT DOCUMENTS

| | | | | |
|---|---|---|---|---|
| 8,905,458 B2 * | 12/2014 | Pipp | B60K 15/05 141/94 | |
| 9,156,439 B2 * | 10/2015 | Hirota | B60R 25/246 | |
| 9,162,685 B2 * | 10/2015 | Schindler | B60W 50/08 | |
| 9,812,017 B2 * | 11/2017 | Krauss | B60R 25/31 | |
| 9,972,150 B2 * | 5/2018 | Da Deppo | G07C 9/28 | |
| 10,071,706 B2 * | 9/2018 | Ette | B60Q 1/0023 | |
| 10,329,829 B2 * | 6/2019 | Matsui | B60R 13/00 | |
| 10,404,254 B2 * | 9/2019 | Tsukao | B60J 5/101 | |
| 10,501,052 B2 * | 12/2019 | Schindler | G01S 15/08 | |
| 10,730,478 B2 * | 8/2020 | Ette | G06F 3/017 | |
| 11,174,665 B2 * | 11/2021 | Tofilescu | G06V 40/20 | |
| 11,384,589 B2 * | 7/2022 | Gunreben | E05F 15/74 | |
| 12,005,857 B2 * | 6/2024 | Uebel | B60R 25/01 | |
| 2007/0205863 A1 * | 9/2007 | Eberhard | G07C 9/00309 340/5.72 | |
| 2008/0296926 A1 * | 12/2008 | Hanzel | H03K 17/941 704/251 | |
| 2014/0142815 A1 * | 5/2014 | Hirota | B60R 25/246 701/49 | |
| 2015/0258962 A1 * | 9/2015 | Khanu | G07C 9/00309 701/2 | |
| 2016/0083995 A1 * | 3/2016 | Dezorzi | B60R 25/01 340/5.72 | |
| 2016/0186480 A1 * | 6/2016 | Krauss | B60R 25/2054 701/49 | |
| 2017/0182975 A1 * | 6/2017 | Mönig | B60R 25/24 | |
| 2019/0111795 A1 * | 4/2019 | Rhodes | E05F 15/76 | |
| 2019/0128043 A1 * | 5/2019 | Ren | E06B 3/52 | |
| 2019/0330908 A1 | 10/2019 | Tofilescu et al. | | |
| 2020/0064444 A1 * | 2/2020 | Regani | G01S 7/006 | |
| 2020/0141176 A1 * | 5/2020 | Ichinose | E05F 15/73 | |
| 2020/0244930 A1 | 7/2020 | Siann et al. | | |
| 2020/0394387 A1 | 12/2020 | Chen et al. | | |
| 2021/0213828 A1 | 7/2021 | Daiminger et al. | | |
| 2021/0384863 A1 | 12/2021 | Omata et al. | | |
| 2024/0317093 A1 * | 9/2024 | Seong | B60L 53/16 | |
| 2025/0381876 A1 * | 12/2025 | Crist | B60L 53/65 | |

FOREIGN PATENT DOCUMENTS

| | | | |
|---|---|---|---|
| CN | 104881117 | A | 9/2015 |
| CN | 106761157 | A | 5/2017 |
| CN | 107685777 | A | 2/2018 |
| CN | 108778815 | A | 11/2018 |
| CN | 109795364 | A | 5/2019 |
| CN | 110103884 | A | 8/2019 |
| CN | 110194074 | A | 9/2019 |
| CN | 209746637 | U | 12/2019 |
| CN | 111332199 | A | 6/2020 |
| CN | 210924707 | U | 7/2020 |
| CN | 111645763 | A | 9/2020 |
| CN | 111674273 | A | 9/2020 |
| CN | 113086025 | A | 7/2021 |
| DE | 102016002577 | A1 | 9/2017 |
| EP | 3059659 | A1 | 8/2016 |
| JP | 2016135962 | A | 7/2016 |
| JP | 2016532794 | A | 10/2016 |
| JP | 202013704 | A | 1/2020 |
| JP | 2020070659 | A | 5/2020 |
| JP | 2020127329 | A | 8/2020 |
| JP | 2020137404 | A | 8/2020 |
| JP | 2020137408 | A | 8/2020 |

OTHER PUBLICATIONS

European Patent Office, "First Office Action" issued on Jul. 30, 2025 for counterpart European Patent Application No. 21939059.8, 8 pages.
International Searching Authority, "International Search Report," issued in connection with International Patent Application No. PCT/CN2021/138189, mailed Mar. 1, 2022, 3 pages.
Japan Patent Office, "Office Action" issued in connection with Japanese Patent Application 2023-565594 mailed on Mar. 18, 2025, 12 pages (English Translation Included).
Korean Intellectual Property Office, "Notice of Submission of Opinions from the Patent Office", issued in connection with KR Patent Application No. 10-2023-7035062 on Nov. 17, 2024, 11 pages.
Japanese Patent Office, "First Office Action," issued in connection with Japanese Patent Application No. 2023-565594, dated Sep. 10, 2024, 12 pages. [English translation provided].
European Patent Office, "Extended European Search Report," issued in connection with European Patent Application No. 21939059.8, dated Oct. 22, 2024, 11 pages.
The State Intellectual Property Office of People's Republic of China, "First Search," issued in connection with Chinese Patent Application No. 202110452772.9, dated Nov. 19, 2021, 1 page.
International Searching Authority, "Written Opinion," issued in connection with International Application No. PCT/CN2021/138189, mailed on Mar. 1, 2022, 9 pages. [English translation included].
The State Intellectual Property Office of People's Republic of China, "Notification to Grant," issued in connection with Chinese Patent Application No. 202110452772.9, dated Mar. 18, 2022, 3 pages. [English translation included].
International Bureau, "International Preliminary Report on Patentability," issued in connection with International No. PCT/CN2021/138189, mailed on Oct. 24, 2023, 11 pages. [English translation included].
Mexican Patent Office, "First Office Action," issued in connection with Mexican Patent Application No. MX/a/2023/012772, dated Nov. 24, 2025, 8 pages. [with English translation].
Intellectual Property India, "Examination Report," issued in connection with Indian Patent Application No. 202317080001, dated Dec. 9, 2025, 6 pages.
Brazilian Patent Office, "Office Action and Search Report," issued in connection with Brazilian Patent Application No. BR112023022395-4, dated Dec. 16, 2025, 8 pages. [with English translation].
European Patent Office, "Communication pursuant to Article 94(3) EPC," issued in connection with European Patent Application No. 21939059.8, dated Feb. 6, 2026, 8 pages.
Vietnam Patent Office, "First Office Action," issued in connection with Vietnamese Patent Application No. 1-2023-08202, dated Feb. 24, 2026, 4 pages. [with English Translation].
Intellectual Property Corporation of Malaysia, "First Office Action," issued in connection with Malaysian Patent Application No. PI2023006258, dated Apr. 21, 2026, 4 pages. [with English Translation].
Mexican Institute of Industrial Property, "Second Office Action," issued in connection with Mexico Patent Application No. MX/a/2023/012772, dated May 8, 2026, 34 pages. [with English translation].
Indonesia Patent Office, "First Office Action," issued in connection with Indonesian Patent Application No. P00202312687, dated Jun. 18, 2026, 4 pages. [with English translation].

* cited by examiner

CHARGING COVER CONTROL METHOD AND DEVICE FOR ELECTRIC VEHICLE, AND ELECTRIC VEHICLE

RELATED APPLICATION

The application is a U.S. National Stage of International Application No. PCT/CN2021/138189, filed Dec. 15, 2022, which claims priority to Chinese Patent Application NO. 202110452772.9, entitled 'method and device for charging cover control of electric vehicle, and electric vehicle', filed on Apr. 26, 2021, both of which are hereby incorporated by reference in their entireties.

TECHNICAL FIELD

The present disclosure relates to the technical field of electric vehicles, and particularly to a charging cover control method and device for an electric vehicle, and an electric vehicle.

BACKGROUND

With the rapid development of the electric vehicle, the market share thereof in the field of automobiles is increasing. The electric vehicle has the characteristics of no pollution, low noise and high energy efficiency, and is one of the strategic emerging industries in China.

The electric vehicle is usually powered by an on-board power supply, and driven by an electric motor instead of a fuel engine. At present, the storage battery is the most widely used power supply for the electric vehicle, and a charging port of the storage battery is usually provided with a charging cover for protection. Before the electric vehicle is charged, a driver needs to press an inner button to control the charging cover to be opened; and after the charging is finished, the charging cover needs to be manually closed. The above operation is complicated, and if forgetting to open the charging cover before getting off the vehicle, the driver needs to go back to the vehicle and press the button, which does not meet the requirement of convenience.

SUMMARY

The embodiments of the present disclosure provide a charging cover control method and device for an electric vehicle, and an electric vehicle, so as to automatically control a charging cover of the electric vehicle to be opened or closed.

In a first aspect, an embodiment of the present disclosure provides a method for charging cover control of an electric vehicle, including:

- detecting a biological signal in the vicinity of a charging cover;
- collecting an image of the front of the charging cover when the biological signal is detected;
- matching collected image with a pre-stored set gesture image; and
- switching a status of the charging cover when the collected image is successfully matched with the pre-stored set gesture image;
- in which the status of the charging cover comprises an open status and a closed status.

In the charging cover control method according to the embodiment of the present disclosure, whether there is a user approaching a charging cover may be determined by detecting a biological signal; and after the biological signal is detected, an image of the front of the charging cover is collected, and an image of a gesture action performed by the user is collected. Next, collected image is matched with a pre-stored set gesture image, and when the matching is successful, it means that the gesture action performed by the user in front of the charging cover is a pre-stored specific gesture action, and the status of the charging cover is automatically switched after gesture matching is successful. Thus, the user can control the charging cover to be opened or closed by performing a specific gesture action in front of the charging cover, without the complicated steps such as manually operating the charging cover by the user, and the charging convenience is improved.

In some embodiments of the present disclosure, the biological signal includes an infrared signal, and whether there is a living body approaching the charging cover is determined by detecting the infrared signal in the vicinity of the charging cover.

In some embodiments of the present disclosure, there are a plurality of the pre-stored set gesture images, and matching the collected image with the pre-stored set gesture images includes:

- matching the collected image with each of the set gesture images;
- determining that gesture matching is successful when a similarity between the collected image and at least one of the set gesture images is greater than or equal to a preset threshold; and
- determining that gesture matching is failed when a similarity between the collected image and each of the set gesture images is less than the preset threshold.

A plurality of the set gesture images are pre-stored, which may be different or similar, and the collected gesture image of the user may be sequentially matched with the set gesture images after the gesture image of the user is collected. Once a similarity between the collected image and at least one of the set gesture images is greater than or equal to a preset threshold, the gesture matching is successful, and at this time, the status of the charging cover can be automatically controlled to be switched.

By adopting many different set gesture images for the gesture matching, the control gesture for switching the status of the charging cover can be diversified, and the user can control the status switching of the charging cover just by performing one of the specific gesture actions. When failing to control with one gesture action, the user also can attempt with other gestures, so as to improve the effectiveness and flexibility of the gesture control. By adopting many similar gesture images for the gesture matching, the user's gesture action can be efficiently matched, and the user can achieve successful matching of the gesture action without making an extreme standard gesture action, thereby improving the success rate of the gesture matching.

In some embodiments of the present disclosure, after the collected image is successfully matched with the pre-stored set gesture image and before switching the status of the charging cover, further includes:

detecting a distance between an object in the vicinity of the charging cover and the charging cover; determining whether the distance between the object in the vicinity of the charging cover and the charging cover is greater than or equal to a predetermined safe distance; and determining whether there is a charging device connected to a current charging stand, when the distance between the object in the vicinity of the charging cover and the charging cover is greater than or equal to the safe distance; switching the status of the charging cover when there is no charging device connected to the current charging stand; and keeping the current status of the charging cover when the distance between the object in the vicinity of the charging cover and the charging cover is less than the safe distance, or when there is a charging device connected to the current charging stand.

When the object in the vicinity of the charging cover is within the safe distance, it may be deemed that there is a shielding object in the vicinity of the charging cover. At this time, the user may be hurt or the charging cover may be damaged by switching the status of the charging cover. However, when there is a charging device connected to the charging stand, the status switching of the charging cover may cause a collision between the charging cover and the charging device. Therefore, before switching the status of the charging cover, it is necessary to ensure that the distance between the object in the vicinity of the charging cover and the charging cover is greater than or equal to the safe distance and there is no charging device connected to the current charging stand, and the status of the charging cover can be switched, otherwise it is necessary to keep the current status of the charging cover.

In some embodiments of the present disclosure, switching the status of the charging cover specifically includes:

determining the status of the current charging cover; switching the charging cover to the closed status when the current charging cover is in the open status; and switching the charging cover to the open status when the current charging cover is in the closed status.

Whether the current charging cover is in the open status or the closed status may be determined by detecting a voltage signal of a mechanical connection position of the charging cover. When the current charging cover is in the open status, a specific action performed by the user is to close the charging cover, and at this time, the charging cover is switched to the closed status. When the current charging cover is in the closed status, a specific action performed by the user is to open the charging cover, and at this time, the charging cover is switched to the open status.

In some embodiments of the present disclosure, when it is determined that the distance between the object in the vicinity of the charging cover and the charging cover is less than the safe distance, a first prompt message indicating that there is a shielding object in the vicinity of the charging cover is sent, so as to prompt the user why the status of the charging cover cannot be switched currently. After the problem is eliminated, the user can perform a specific action again to trigger the status switching of the charging cover.

In some embodiments of the present disclosure, when it is determined that there is a charging device connected to the current charging stand, a second prompt message indicating that a charging device has been connected to the charging stand is sent, so as to prompt the user why the status of the charging cover cannot be switched currently. After the charging device is pulled out, the user may perform a specific action again to trigger the status switching of the charging cover.

In some embodiments of the present disclosure, an optical ranging device is adopted to emit light with a set wavelength to the vicinity of the charging cover, and the light is reflected by the object in the vicinity of the charging cover after being incident thereon, so a distance between the object and the charging cover is obtained from half of a product of time taken by the optical ranging device from emitting the light with the set wavelength to receiving the reflected light with the set wavelength and a light velocity. Basing on the distance, it is possible to determine whether the object in the vicinity of the charging cover is within a safe distance of the charging cover, and decide whether to trigger a subsequent operation.

In some embodiments of the present disclosure, a first connection confirmation point (CC1) is set at a charging stand port, and whether there is a charging device connected to the charging stand is determined by detecting a voltage signal of CC1. If the voltage signal of CC1 is detected, it means that there is a charging device (e.g., a charging gun) connected to the charging stand; and if the voltage signal of CC1 is not detected, it means that there is no charging device connected to the charging stand.

In a second aspect, an embodiment of the present disclosure provides a device for charging cover control, including: a control module, a biological signal detection module and an image collection module; in which the control module is connected to a charging cover motor of an electric vehicle and sends a control instruction thereto, and it is possible to control the charging cover to be opened or closed by driving the charging cover motor.

The biological signal detection module is connected to the control module and configured to detect a biological signal in the vicinity of the charging cover; and the image collection module is connected to the control module and configured to collect an image of the front of the charging cover.

The control module is configured to collect the image of the front of the charging cover when the biological signal is detected; match collected image with a pre-stored set gesture image; and switch a status of the charging cover when the collected image is successfully matched with the pre-stored set gesture image; and the status of the charging cover includes an open status and a closed status.

The control module can drive the biological signal detection module to detect the biological signal in the vicinity of the charging cover, so as to determine whether there is a user approaching the charging cover; and after the biological signal is detected, the control module drives the image collection module to collect an image of the front of the charging cover. The image collection module sends the collected image to the control module, and the control module matches the collected image with a pre-stored set gesture image. When the matching is successful, it means that a gesture action performed by the user in front of the charging cover is a pre-stored specific gesture action, and the status of the charging cover is automatically switched after gesture matching is successful. Therefore, the charging cover may be automatically controlled to be opened or closed by a specific gesture action in front of the charging cover performed by the user, without the complicated steps such as manually operating the charging cover by the user, and the charging convenience is improved.

In some embodiments of the present disclosure, the biological signal includes an infrared signal, and whether there is a living body approaching the charging cover is determined by detecting the infrared signal in the vicinity of the charging cover.

In some embodiments of the present disclosure, only when the biological signal detection module detects a biological signal in the vicinity of the charging cover, the image collection module is driven to collect the image of the front of the charging cover, so as to avoid the operation of continuously collecting the image of the front of the charging cover and avoid performing image matching for a large amount of image data, thereby avoiding the generation of excessive invalid data and improving the effectiveness of gesture matching.

In some embodiments of the present disclosure, the control module may pre-store a plurality of the set gesture images, and the set gesture images may be different or similar, and the collected gesture image of the user may be sequentially matched with the set gesture images after the gesture image of the user is collected. Once a similarity between the collected image and at least one of the set gesture images is greater than or equal to a preset threshold, the gesture matching is successful, and at this time, the status of the charging cover can be automatically controlled to be switched.

By adopting many different set gesture images for the gesture matching, the control gesture for switching the status of the charging cover can be diversified, and the user can control the status switching of the charging cover just by performing one of the specific gesture actions. When failing to control with one gesture action, the user also can attempt with other gestures, so as to improve the effectiveness and flexibility of the gesture control. By adopting many similar gesture images for the gesture matching, the user's gesture action can be efficiently matched, and the user can achieve successful matching of the gesture action without making an extreme standard gesture action, thereby improving the success rate of the gesture matching.

In some embodiments of the present disclosure, the charging cover control device further includes an optical ranging module and a charging stand detection module;

- the optical ranging module is connected to the control module and configured to detect a distance between an object in the vicinity of the charging cover and the charging cover;
- the charging stand detection module is connected to the control module and configured to detect a connection status of the charging stand; and
- the control module is configured to determine whether to switch a status of the charging cover based on the connection status of the current charging stand and the detected distance between the object in the vicinity of the charging cover and the charging cover, when the collected image is successfully matched with the pre-stored set gesture image; and the status of the charging cover comprises an open status and a closed status.

When the collected image is successfully matched with the pre-stored set gesture image, it means that the gesture which is currently performed by the user is successfully matched. At this time, it is necessary to further detect whether there is a shielding object in the vicinity of the charging cover, and the charging stand detection module should further detect the current connection condition of the charging stand. The optical ranging module and the charging stand detection module send detection results to the control module, and the control module determines whether to switch the status of the charging cover based on the detection results. Therefore, the user automatically controls the charging cover to be opened or closed by performing a specific action in front of the charging cover and when the charging cover is in a safe status, without the complicated steps such as manually operating the charging cover by the user, and the charging convenience is improved.

In some embodiments of the present disclosure, the control module is specifically configured to determine whether the distance between the object in the vicinity of the charging cover and the charging cover is greater than or equal to a predetermined safe distance; determine whether there is a charging device connected to the current charging stand when the distance between the object in the vicinity of the charging cover and the charging cover is greater than or equal to the safe distance; drive a charging cover motor to switch a status of the charging cover when there is no charging device connected to the current charging stand; and drive the charging cover motor to keep the current status of the charging cover when the distance between the object in the vicinity of the charging cover and the charging cover is less than the safe distance, or when there is a charging device connected to the current charging stand.

When the object in the vicinity of the charging cover is within the safe distance, it may be deemed that there is a shielding object in the vicinity of the charging cover. At this time, the user may be hurt or the or the charging cover may be damaged by switching the status of the charging cover. However, when there is a charging device connected to the charging stand, the status switching of the charging cover may cause a collision between the charging cover and the charging device. Therefore, before switching the status of the charging cover, it is necessary to ensure that the distance between the object in the vicinity of the charging cover and the charging cover is greater than or equal to the safe distance, and there is no charging device connected to the current charging stand, and the status of the charging cover can be switched otherwise it is necessary to keep the current status of the charging cover.

In some embodiments of the present disclosure, the control module sends a detection control instruction to the optical ranging module, and the optical ranging module starts to detect the distance between the object in the vicinity of the charging cover and the charging cover based on the detection control instruction. The optical ranging module may adopt a mature optical ranging device in the prior art to emit light with a set wavelength to the vicinity of the charging cover, and the light is reflected by the object in the vicinity of the charging cover after being incident thereon, so the distance between the object and the charging cover is obtained from half of a product of time taken by the optical ranging device from emitting the light with the set wavelength to receiving the reflected light with the set wavelength and a light velocity. The optical ranging module sends detected distance to the control module, and basing on the distance, the control module determines whether the object in the vicinity of the charging cover is within the safe distance of the charging cover. When the distance between the object in the vicinity of the charging cover and the charging cover is less than the safe distance, the control module drives the charging cover motor to keep the current status of the charging cover. When the distance between the object in the vicinity of the charging cover and the charging cover is greater than or equal to the safe distance, the connection status of the charging stand is further determined.

In some embodiments of the present disclosure, the control module sends a detection control instruction to the charging stand detection module. The charging stand detection module detects a voltage signal of CC1 based on the detection control instruction, and sends detected voltage signal to the control module. When detecting that the voltage signal of CC1 is 0, the control module determines that there is no charging device connected to the charging stand, and at this time, the control module drives the charging cover motor to switch the status of the charging cover. When the detected voltage signal of CC1 is not 0, it may be determined that there is a charging device connected to the charging stand, and at this time, the control module drives the charging cover motor to keep the current status of the charging cover.

In some embodiments of the present disclosure, the charging cover control device further includes a charging cover status detection module, which is connected to the control module and configured to detect the status of the charging cover.

The control module sends a detection control instruction to the charging cover status detection module, and the charging cover status detection module detects a voltage signal of a mechanical connection position of the charging cover based on the detection control instruction and sends detected voltage signal to the control module. The control module determines the status of the current charging cover based on the detected voltage signal, drives the charging cover motor to close the charging cover when the current charging cover is in the open status, and drives the charging cover motor to open the charging cover when the current charging cover is in the closed status, thereby achieving the status switching of the charging cover.

In some embodiments of the present disclosure, the charging cover control device further includes a message prompting module connected to the control module, and the message prompting module may be a voice player, an indicator light, a display screen, etc.

In some embodiments of the present disclosure, when determining that the distance between the object in the vicinity of the charging cover and the charging cover is less than the safe distance, the control module sends a first prompt message indicating that there is a shielding object in the vicinity of the charging cover to the message prompting module, and the message prompting module prompts the user that there is a shielding object in the vicinity of the charging cover based on the first prompt message. After the problem is eliminated, the user can perform a specific action again to trigger the status switching of the charging cover.

In some embodiments of the present disclosure, when determining that there is a charging device connected to the charging stand, the control module sends a second prompt message indicating that a charging device has been connected to the charging stand to the message prompting module, and the message prompting module prompts the user that a charging device has been connected to the charging stand based on the second prompt message. After the charging device is pulled out, the user can perform a specific action again to trigger the status switching of the charging cover.

In a third aspect, an embodiment of the present disclosure provides an electric vehicle, including any charging cover control device aforementioned, and the charging cover control device is connected to a charging cover motor. The electric vehicle automatically controls the charging cover to be opened or closed by the user performs a specific gesture in front of the charging cover.

BRIEF DESCRIPTION OF THE DRAWINGS

In order to more clearly illustrate the technical solutions in the embodiments of the present disclosure, the drawings to be used in the description of the embodiments will be briefly introduced below. Obviously, the drawings introduced below only illustrate some embodiments of the present disclosure, and other drawings may be obtained by those of ordinary skill in the art from these drawings without paying creative labor.

Figure 1:
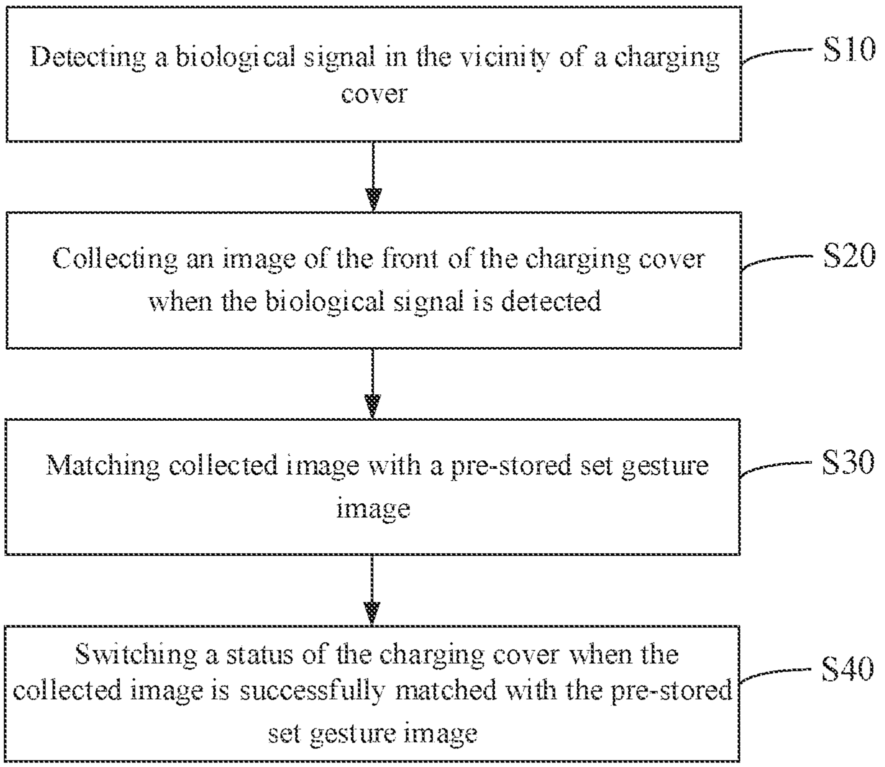
FIG. 1 illustrates a first flowchart of a charging cover control method according to an embodiment of the present disclosure.

In which, 11—control module, 12—biological signal detection module, 13—image collection module, 14—optical ranging module, 15—charging stand detection module, 16—charging cover status detection module, and 17—message prompting module.

DETAILED DESCRIPTION

In order that the above objectives, features and advantages of the present disclosure are more apparent and understandable, the present disclosure will be further explained with reference to the drawings and the embodiments. However, the exemplary embodiments may be implemented in various forms and should not be construed as being limited to those set forth here. On the contrary, these embodiments are provided so that the present disclosure is thorough and complete, and will fully convey the concept of the exemplary embodiments to those skilled in the art. In the drawings, the same reference numerals denote the same or similar structures, and the repeated description thereof will be omitted. The terms described in the present disclosure to express positions and directions are all illustrated by taking the drawings as examples and may be changed as needed, and all the changes are included in the protection scope of the present disclosure. The drawings of the present disclosure are merely illustrative of relative positional relationships and do not represent any true scale.

An electric vehicle takes a battery pack as a power source, and uses a motor to convert electric energy into mechanical energy for travelling. An electric drive and control system is the core of the electric vehicle, and is the biggest difference from the internal combustion engine vehicle. Other parts of the electric vehicle are substantially the same as those of the internal combustion engine vehicle. The electric drive and control system is composed of a driving motor, a power supply and a speed governing control device of the motor, etc.

The electric vehicle is usually provided with a charging stand at a body or a head thereof, and the charging stand is connected to a battery in the electric vehicle. After a charging gun head on a charging pile is inserted into the charging stand, the electric vehicle can be charged. In order to protect the charging stand, a charging cover is usually provided on the charging stand. When the electric vehicle needs to be charged, the driver should press an inner button to control the charging cover to be opened, and after the charging is finished, it is necessary to manually close the charging cover. The above operation is complicated, and when forgetting to open the charging cover before getting off the vehicle, the driver should go back to the vehicle to press the button, which does not meet the requirement of convenience.

In view of this, an embodiment of the present disclosure provides a charging cover control method, which can automatically control a charging cover to be opened or closed by detecting a person's gesture action.

FIG. 1 illustrates a first flowchart of a charging cover control method according to an embodiment of the present disclosure.

As illustrated in FIG. 1, the charging cover control method includes:

S10: detecting a biological signal in the vicinity of a charging cover;

S20: collecting an image of the front of the charging cover when the biological signal is detected;

S30: matching collected image with a pre-stored set gesture image;

S40: switching a status of the charging cover when the collected image is successfully matched with the pre-stored set gesture image.

In this embodiment, the status of the charging cover includes an open status and a closed status. The mode of detecting the biological signal may be a real-time detection or a periodic detection, which is not limited here.

In the charging cover control method according to the embodiment of the present disclosure, whether there is a user approaching a charging cover is determined by detecting a biological signal; and after the biological signal is detected, an image of the front of the charging cover is collected, so as to an image of a gesture action performed by the user is collected. Next, the collected image is matched with a pre-stored set gesture image, and when the matching is successful, it means that the gesture action performed by the user in front of the charging cover is a pre-stored specific gesture action, and the status of the charging cover is automatically switched after the gesture matching is successful. In this embodiment, the status switching of the charging cover means that when being in an open status, the charging cover is switched to a closed status; and when being in the closed status, the charging cover is switched to the open status. The user can perform specific gesture action in the case of that the charging cover is in any of the above status, so as to switch to another status is achieved.

Thus, the user controls the charging cover to be opened or closed by performing a specific gesture action in front of the charging cover, without the complicated steps such as manually operating the charging cover by the user, and the charging convenience is improved.

During implementations, the biological signal includes an infrared signal, and the infrared signal is a signal emitted by a living body to be distinguished from other objects. The wavelength of the infrared signal is greater than that of visible light, and will not interfere with the judgment of other things visible to the user's eyes. In addition, the biological signal may adopt any other signal that could be used to distinguish a human body from other objects, and is not limited here.

In the embodiment of the present disclosure, the image of the front of the charging cover is collected only when the biological signal in the vicinity of the charging cover is detected, so as to avoid the operation of continuously collecting the image of the front of the charging cover and avoid performing image matching for a large amount of image data, thereby avoiding the generation of excessive invalid data and improving the effectiveness of gesture matching.

In the embodiment of the present disclosure, a plurality of set gesture images may be pre-stored, which may be different or similar, and the collected gesture image of the user may be sequentially matched with the plurality of set gesture images. Once a similarity between the collected image and at least one of the set gesture images is greater than or equal to a preset threshold, the gesture matching is successful, and at this time, the status of the charging cover is automatically controlled to be switched.

By adopting many different set gesture images for the gesture matching, the control gesture for switching the status of the charging cover can be diversified, and the user can control the status switching of the charging cover just by performing one of the specific gesture actions. When failing to control with one gesture action, the user also can attempt with other gestures, so as to improve the effectiveness and flexibility of the gesture control.

By adopting similar gesture images for the gesture matching, the user's gesture action can be efficiently matched, and the user can achieve successful matching of the gesture action without making an extreme standard gesture action, thereby improving the success rate of the gesture matching.

In the embodiment of the present disclosure, after the gesture matching is successful and before determining whether to switch the status of the charging cover, it is necessary to further detect whether there is a shielding object in the vicinity of the charging cover and further detect the current connection condition of the charging stand.

Figure 2:
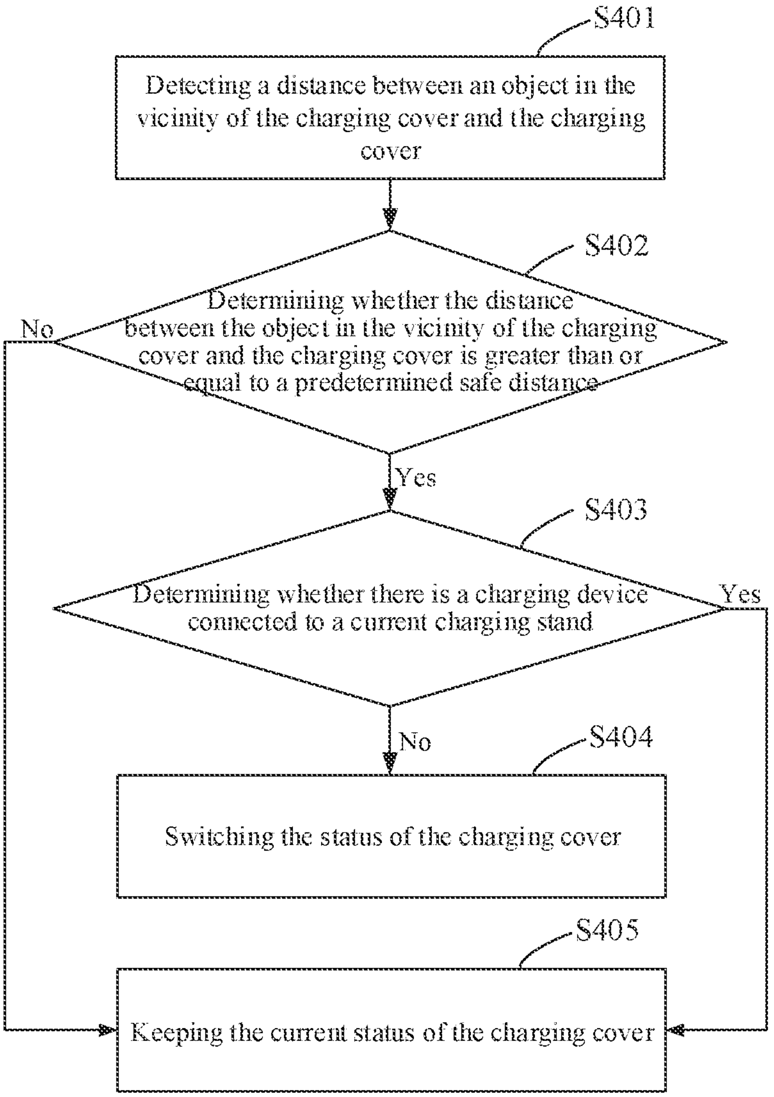
FIG. 2 illustrates a second flowchart of a charging cover control method according to an embodiment of the present disclosure.

FIG. 2 illustrates a second flowchart of a charging cover control method according to an embodiment of the present disclosure.

As illustrated in FIG. 2, specifically, in the step S40, after the collected image is successfully matched with the pre-stored set gesture image and before switching the status of the charging cover, the method further includes the following steps:

S401: detecting a distance between an object in the vicinity of the charging cover and the charging cover;

S402: determining whether the distance between the object in the vicinity of the charging cover and the charging cover is greater than or equal to a predetermined safe distance; if so, performing step S403; and if not, performing step S405;

S403: determining whether there is a charging device connected to a current charging stand; if not, performing step S404; and if so, performing step S405;

S404: switching the status of the charging cover;

S405: keeping the current status of the charging cover.

When the collected image is successfully matched with the set gesture image, it means that the gesture which is currently performed by the user is successfully matched. At this time, it is necessary to further determine whether the distance between the object in the vicinity of the charging cover and the charging cover is greater than or equal to a predetermined safe distance, and the safe distance is a space distance required when the charging cover is switched from the closed status to the open status. When the object in the vicinity of the charging cover is located beyond the safe distance, it may be deemed that there is no shielding object in the vicinity of the charging cover, and when the object in the vicinity of the charging cover is within the safe distance, it may be deemed that there is a shielding object in the vicinity of the charging cover. When being in the vicinity of the charging cover, the shielding object may be the user's hand or any other object in front of the charging cover. If the user's hand is too close to the charging cover, the user may be hurt during the status switching of the charging cover; and if there is any other object in front of the charging cover, the charging cover may be damaged during the status switching of the charging cover. Therefore, according to the embodiment of the present disclosure, it is necessary to determine whether the distance between the object in the vicinity of the charging cover and the charging cover is greater than or equal to the safe distance.

When it is determined that the distance between the object in the vicinity of the charging cover and the charging cover is greater than or equal to the safe distance, it is further determined whether there is a charging device connected to the charging stand. If there is a charging device connected to the charging stand, it means that the charging stand is charging or the charging device has not been pulled out. At this time, if the charging cover is switched to be closed, a collision will be caused between the charging cover and the charging device. In order to avoid the problem, it is necessary to determine the connection status of the current charging stand.

When it is determined that the distance between the object in the vicinity of the charging cover and the charging cover is greater than or equal to the safe distance, and there is no charging device connected to the current charging stand, the status of the charging cover may be switched; and when either or both of the above conditions are not satisfied, it is necessary to keep the current status of the charging cover.

Figure 3:
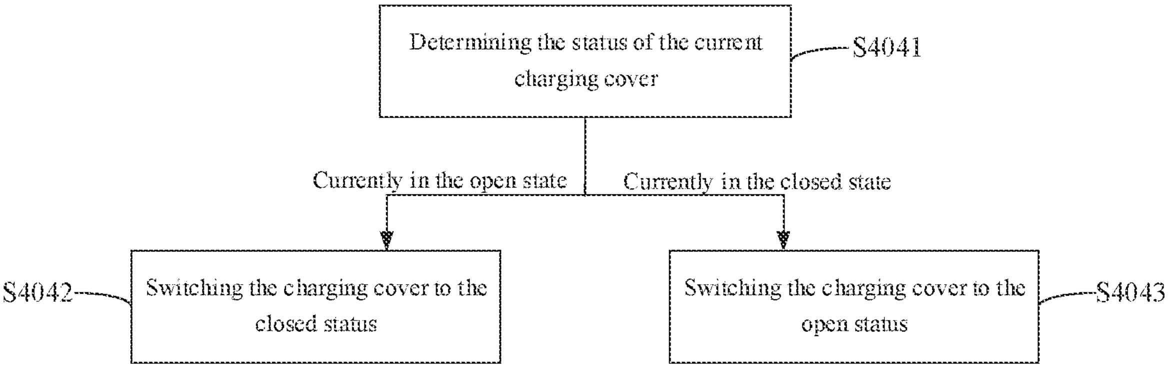
FIG. 3 illustrates a third flowchart of a charging cover control method according to an embodiment of the present disclosure.

FIG. 3 illustrates a third flowchart of a charging cover control method according to an embodiment of the present disclosure.

As illustrated in FIG. 3, the above step S404 specifically includes the following steps:

S4041: determining the status of the current charging cover; when the current charging cover is in the open status, performing step S4042; and when the current charging cover is in the closed status, performing step S4043;

S4042: switching the charging cover to the closed status;

S4043: switching the charging cover to the open status.

During implementations, whether the current charging cover is in the open status or the closed status may be determined by detecting a voltage signal of a mechanical connection position of the charging cover. When the current charging cover is in the open status, a specific action performed by the user is used to close the charging cover, and at this time, the charging cover is switched to the closed status. When the current charging cover is in the closed status, a specific action performed by the user is used to open the charging cover, and at this time, the charging cover is switched to the open status.

Further, when it is determined that the distance between the object in the vicinity of the charging cover and the charging cover is less than the safe distance, a first prompt message indicating that there is a shielding object in the vicinity of the charging cover is sent, so as to prompt the user why the status of the charging cover cannot be switched currently. After the above problem is eliminated, the user can perform a specific action again to trigger the status switching of the charging cover.

Similarly, when it is determined that there is a charging device connected to the current charging stand, a second prompt message indicating that a charging device has been connected to the charging stand may be sent, so as to prompt the user why the status of the charging cover cannot be switched currently. After the charging device is pulled out, the user can perform a specific action again to trigger the status switching of the charging cover.

During implementations, detecting the distance between the object in the vicinity of the charging cover and the charging cover may adopt the following method:

emitting light with a set wavelength to the vicinity of the charging cover;

receiving light with the set wavelength reflected by an object in the vicinity of the charging cover; and determining the distance between the object in the vicinity of the charging cover and the charging cover based on time taken from emitting to receiving the light with the set wavelength and a light velocity.

An optical ranging device is adopted to emit light with a set wavelength to the vicinity of the charging cover, and the light is reflected by the object in the vicinity of the charging cover after being incident thereon, so the distance between the object and the charging cover may be obtained from half of a product of time taken by the optical ranging device from emitting the light with the set wavelength to receiving the reflected light with the set wavelength and a light velocity. Basing on the distance, it is possible to determine whether the object in the vicinity of the charging cover is within a safe distance of the charging cover, and decide whether to trigger a subsequent operation.

The connection status of the charging stand may be detected by the following method:

detecting a voltage signal of a first connection confirmation point in the charging stand;

determining that there is no charging device connected to the charging stand when the voltage signal of the first connection confirmation point is 0; and determining that there is a charging device connected to the charging stand when the voltage signal of the first connection confirmation point is not 0.

A first connection confirmation point (CC1) is set at a charging stand port, and whether there is a charging device connected to the charging stand is determined by detecting a voltage signal of CCL. If the voltage signal of CC1 is detected, it means that there is a charging device (e.g., a charging gun) connected to the charging stand; and if the voltage signal of CC1 is not detected, it means that there is no charging device connected to the charging stand.

Figure 4:
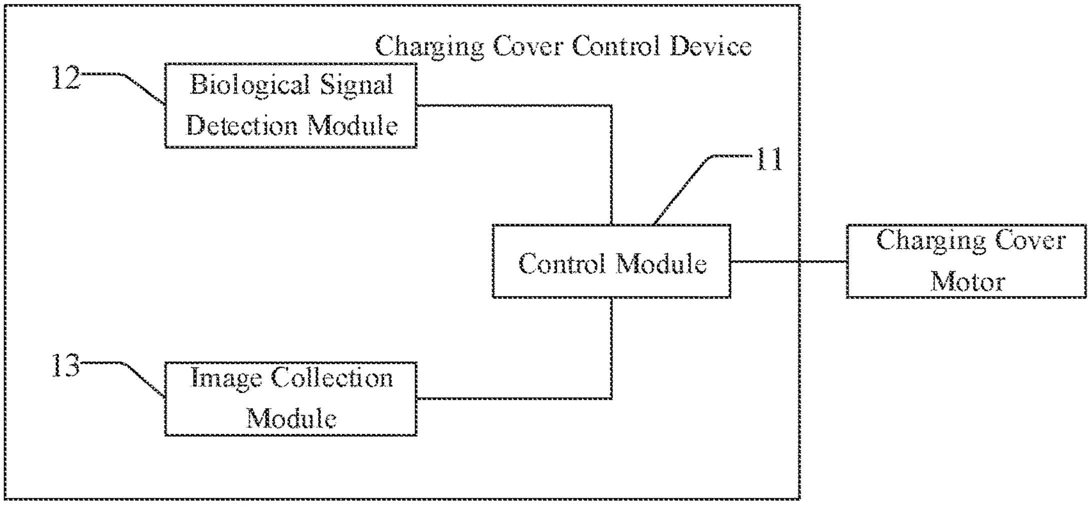
FIG. 4 illustrates a first schematic diagram of a structure of a charging cover control device according to an embodiment of the present disclosure.

On the other hand, an embodiment of the present disclosure provides a device for charging cover control. FIG. 4 illustrates a first schematic diagram of a structure of a device for charging cover control according to an embodiment of the present disclosure.

As illustrated in FIG. 4, the device for charging cover control includes a control module 11, a biological signal detection module 12 and an image collection module 13, and the control module 11 is connected to a charging cover motor of an electric vehicle and sends a control instruction thereto, and controls the charging cover to be opened or closed by driving the charging cover motor;

the biological signal detection module 12 is connected to the control module 11 and configured to detect a biological signal in the vicinity of the charging cover;

the image collection module 13 is connected to the control module 11 and configured to collect an image of the front of the charging cover.

The control module 11 is configured to collect the image of the front of the charging cover when the biological signal is detected; match the collected image with a pre-stored set gesture image; and switch a status of the charging cover when the collected image is successfully matched with the pre-stored set gesture image; the status of the charging cover includes an open status and a closed status.

The control module 11 drives the biological signal detection module 12 to detect the biological signal in the vicinity of the charging cover, so as to determine whether there is a user approaching the charging cover; and after the biological signal is detected, the control module 11 drives the image collection module 13 to collect an image of the front of the charging cover. The image collection module 13 sends the collected image to the control module 11, the control module 11 matches the collected image with a pre-stored set gesture image; when the matching is successful, it means that a gesture action performed by the user in front of the charging cover is a pre-stored specific gesture action, and the status of the charging cover is automatically switched after gesture matching is successful. Therefore, the charging cover may be automatically controlled to be opened or closed by a specific gesture action in front of the charging cover performed by the user, without the complicated steps such as manually operating the charging cover by the user, and the charging convenience is improved.

During implementations, the biological signal may include an infrared signal, and the biological signal detection module 12 may adopt an infrared detection device. In addition, the biological signals may also be a signal capable of distinguishing the human body from other objects, and is not limited here. Accordingly, the biological signal detection module 12 only needs to adopt a detection device capable of detecting corresponding signal.

According to the embodiment of the present disclosure, only when a biological signal in the vicinity of the charging cover is detected by the biological signal detection module 12, the image collection module 13 is driven to collect the image of the front of the charging cover, so as to avoid the operation of continuously collecting the image of the front of the charging cover and avoid performing image matching for a large amount of image data, thereby avoiding the generation of excessive invalid data and improving the effectiveness of gesture matching.

In the embodiment of the present disclosure, the control module 11 may pre-store a plurality of the set gesture images, the set gesture images may be different or similar, and the collected gesture image of the user may be sequentially matched with the set gesture images. Once a similarity between the collected image and at least one of the set gesture images is greater than or equal to a preset threshold, the gesture matching is successful, and at this time, the status of the charging cover can be automatically controlled to be switched.

By adopting many different set gesture images for the gesture matching, the control gesture for switching the status of the charging cover can be diversified, and the user can control the status switching of the charging cover just by performing one of the specific gesture actions. When failing to control with one gesture action, the user also can attempt with other gestures, so as to improve the effectiveness and flexibility of the gesture control.

By adopting many similar gesture images for the gesture matching, the user's gesture action can be efficiently matched, and the user can achieve successful matching of the gesture action without making an extreme standard gesture action, thereby improving the success rate of the gesture matching.

In the embodiment of the present disclosure, after the gesture matching is successful and before determining whether to switch the status of the charging cover, it is necessary to further detect whether there is a shielding object in the vicinity of the charging cover and further detect the current connection condition of the charging stand.

Figure 5:
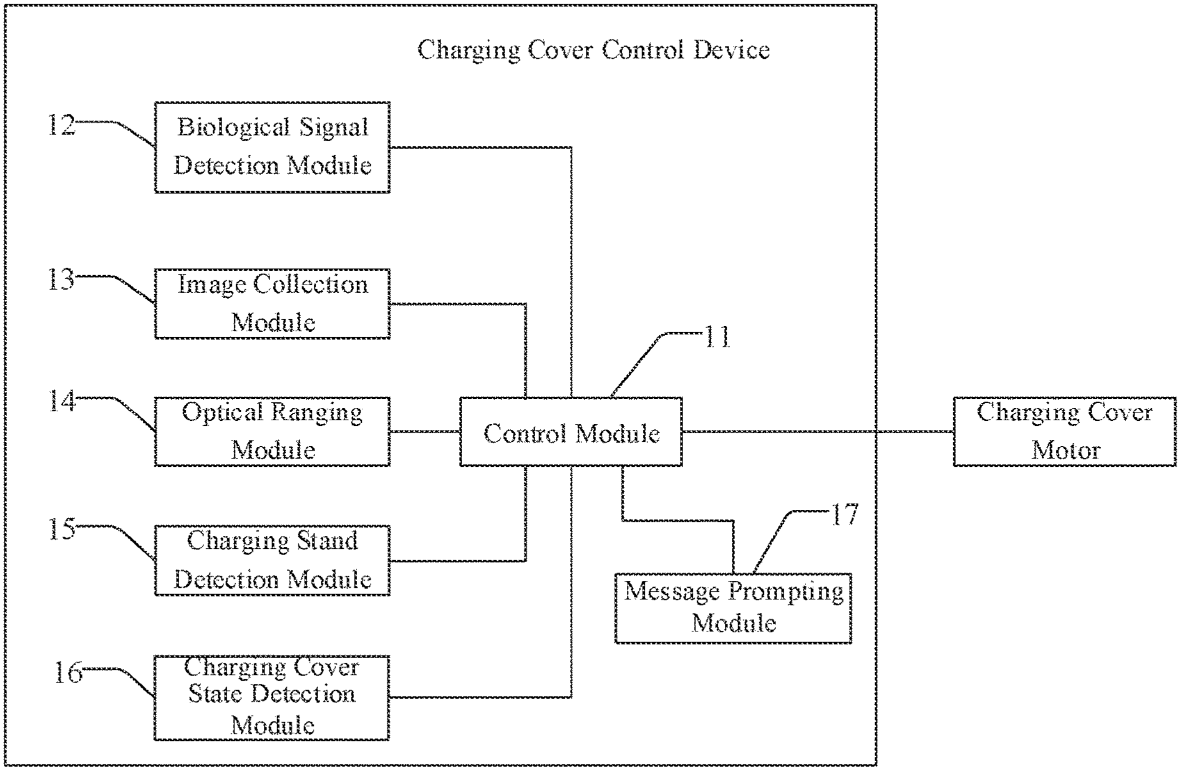
FIG. 5 illustrates a second schematic diagram of a structure of a charging cover control device according to an embodiment of the present disclosure.

FIG. 5 illustrates a second schematic diagram of a structure of a device for charging cover control according to an embodiment of the present disclosure.

As illustrated in FIG. 5, the device for charging cover control further includes an optical ranging module 14 and a charging stand detection module 15.

The optical ranging module 14 is connected to the control module 11 and configured to detect a distance between an object in the vicinity of the charging cover and the charging cover; and the charging stand detection module 15 is connected to the control module 11 and configured to detect a connection status of the charging stand.

Specifically, the control module 11 is configured to determine whether the distance between the object in the vicinity of the charging cover and the charging cover is greater than or equal to a predetermined safe distance when the collected image is successfully matched with the pre-stored set gesture image; determine whether there is a charging device connected to the current charging stand when the distance between the object in the vicinity of the charging cover and the charging cover is greater than or equal to the safe distance; drive a charging cover motor to switch the status of the charging cover when there is no charging device connected to the current charging stand; and drive the charging cover motor to keep the current status of the charging cover when the distance between the object in the vicinity of the charging cover and the charging cover is less than the safe distance, or when there is a charging device connected to the current charging stand.

When the control module 11 successfully matches the image collected by the image collection module 13 with the pre-stored set gesture image, it means that the gesture which is currently performed by the user is successfully matched. At this time, it is necessary to further determine whether the distance between the object in the vicinity of the charging cover and the charging cover is greater than or equal to a predetermined safe distance, and the safe distance is a space distance required when the charging cover is switched from the closed status to the open status. When the object in the vicinity of the charging cover is located beyond the safe distance, it may be deemed that there is no shielding object in the vicinity of the charging cover, and when the object in the vicinity of the charging cover is within the safe distance, it may be deemed that there is a shielding object in the vicinity of the charging cover. When being in the vicinity of the charging cover, the shielding object may be the user's hand or any other object in front of the charging cover. If the user's hand is too close to the charging cover, the user may be hurt during the status switching of the charging cover; and if there is any other object in front of the charging cover, the charging cover may be damaged during the status switching of the charging cover. Therefore, according to the embodiment of the present disclosure, it is necessary to determine whether the distance between the object in the vicinity of the charging cover and the charging cover is greater than or equal to the safe distance.

During implementations, the control module 11 may send a detection control instruction to the optical ranging module 14, and the optical ranging module 14 starts to detect the distance between the object in the vicinity of the charging cover and the charging cover based on the detection control instruction. The optical ranging module 14 may adopt a mature optical ranging device in the prior art to emit light with a set wavelength to the vicinity of the charging cover, and the light is reflected by the object in the vicinity of the charging cover after being incident thereon, so the distance between the object and the charging cover may be obtained from half of a product of time taken by the optical ranging device from emitting the light with the set wavelength to receiving the reflected light with the set wavelength and a light velocity. The optical ranging module 14 sends the detected distance to the control module 11, and Basing on the distance, the control module 11 determines whether the object in the vicinity of the charging cover is within the safe distance of the charging cover. When the distance between the object in the vicinity of the charging cover and the charging cover is less than the safe distance, the control module 11 drives the charging cover motor to keep the current status of the charging cover. When the distance between the object in the vicinity of the charging cover and the charging cover is greater than or equal to the safe distance, the control module 11 sends a detection control instruction to the charging stand detection module 15. The charging stand detection module 15 detects the current connection status of the charging stand based on the detection control instruction.

During implementations, a first connection confirmation point (CC1) is set at a charging stand port, and a voltage detection circuit is disposed at CC1. Whether there is a charging device connected to the charging stand is determined by detecting a voltage signal of CC1. The charging stand detection module 15 may be specifically provided as the above voltage detection circuit. After detecting the voltage signal of CC1, the charging stand detection module 15 sends the detected voltage signal to the control module 11.

When the control module 11 detects that the voltage signal of CC1 is 0, it can be determined that there is no charging device connected to the charging stand, and at this time, the control module 11 drives the charging cover motor to switch the status of the charging cover. When the detected voltage signal of CC1 is not 0, it can be determined that there is a charging device connected to the charging stand, and at this time, the control module 11 drives the charging cover motor to keep the current status of the charging cover.

When it is determined that the distance between the object in the vicinity of the charging cover and the charging cover is greater than or equal to the safe distance, and there is no charging device connected to the current charging stand, the status of the charging cover can be switched; and when either or both of the above conditions are not satisfied, it is necessary to keep the current status of the charging cover, thereby avoiding the safety problems.

As illustrated in FIG. 5, the charging cover control device further includes: a charging cover status detection module 16 connected to the control module 11 and configured to detect the status of the charging cover.

A voltage detection circuit is disposed at a mechanical connection position of the charging cover, the charging cover status detection module 16 specifically may be the above voltage detection circuit, and the current status of the charging cover may be determined by detecting the voltage signal at the mechanical connection position.

During implementations, the control module 11 sends a detection control instruction to the charging cover status detection module 16, and the charging cover status detection module 16 detects the voltage signal at the mechanical connection position of the charging cover based on the detection control instruction, and sends detected voltage signal to the control module 11.

The control module 11 determines the status of the current charging cover based on the detected voltage signal, drives the charging cover motor to close the charging cover when the current charging cover is in the open status, and drives the charging cover motor to open the charging cover when the current charging cover is in the closed status, thereby achieving the status switching of the charging cover.

As illustrated in FIG. 5, the charging cover control device further includes a message prompting module 17 connected to the control module 11. The message prompting module 17 may be a voice player, an indicator lamp, a display screen, etc., which is not limited here.

When determining that the distance between the object in the vicinity of the charging cover and the charging cover is less than the safe distance, the control module 11 sends a first prompt message indicate that there is a shielding object in the vicinity of the charging cover to the message prompting module 17, and the message prompting module 17 prompts the user that there is a shielding object in the vicinity of the charging cover based on the first prompt message.

Specifically, if the message prompting module 17 is a voice player, it automatically plays a prompt sound that there is a shielding object in the vicinity of the charging cover when the above first prompt message is received. If the message prompting module 17 is an indicator lamp, the indicator lamp may be twinkled according to a preset number of times or flashed with a specific color when the above first prompt message is received. If the message prompting module 17 is a display screen, the wording that there is a shielding object in the vicinity of the charging cover may be displayed on the display screen when the above first prompt message is received, so as to prompt the user why the status of the charging cover cannot be switched currently. After the problem is eliminated, the user can perform a specific action again to trigger the status switching of the charging cover.

When determining that there is a charging device connected to the charging stand, the control module 11 sends a second prompt message indicating that a charging device has been connected to the charging stand to the message prompting module 17, and the message prompting module 17 prompts the user that a charging device has been connected to the charging stand based on the second prompt message.

Specifically, if the message prompting module 17 is a voice player, it automatically plays a prompt sound that a charging stand has been connected to the charging device when the above second prompt message is received. If the message prompting module 17 is an indicator lamp, the indicator lamp may be twinkled according to a preset number of times or flashed with a specific color when the above second prompt message is received. If the message prompting module 17 is a display screen, the wording that a charging device has been connected to the charging stand may be displayed on the display screen when the above second prompt message is received, so as to prompt the user why the status of the charging cover cannot be switched currently. After the charging device is pulled out, the user can perform a specific action again to trigger the status switching of the charging cover.

It should be noted that when the message prompting module 17 adopts an indicator lamp, the flashing times or the colors of the indicator lamp are different for prompting the user that 'there is a shielding object in the vicinity of the charging cover' and 'a charging device has been connected to the charging stand', so as to distinguish different reasons, thereby facilitating the user's judgement.

Therefore, by connecting the charging cover control device to the charging cover motor, the charging cover is automatically controlled to be opened or closed when the user performs a specific action in front of the charging cover.

Based on the same inventive concept, an embodiment of the present disclosure further provides an electric vehicle, including any device for charging cover control aforementioned, and the device for charging cover control is connected to a charging cover motor.

In the charging cover control method and device and the electric vehicle according to the embodiments of the present disclosure, whether there is a user approaching a charging cover is determined by detecting a biological signal; and after the biological signal is detected, an image of the front of the charging cover is collected which is matched with a pre-stored set gesture image, and when the gesture matching is successful, it means that the user currently performs a specific gesture action controlling the charging cover. At this time, the charging cover may be automatically controlled to be opened or closed, without the complicated steps such as manually operating the charging cover by the user, and the charging convenience is improved.

Although the optional embodiments of the present disclosure have been described, those skilled in the art may make additional changes and modifications to these embodiments once acquiring the basic inventive concepts. Therefore, the appended claims are intended to be interpreted as including the optional embodiment and all changes and modifications that fall within the scope of the present disclosure.

Obviously, those skilled in the art may make various modifications and variations to the present disclosure without departing from the spirit and scope of the present disclosure. Therefore, the present disclosure is intended to include those modifications and variations provided that they fall within the scope of the claims and the equivalents thereof

What is claimed is:

1. A method for charging cover control of an electric vehicle, comprising:

detecting a biological signal in a vicinity of a charging cover;

collecting an image of a front of the charging cover when the biological signal is detected;

matching collected image with a pre-stored set gesture image; and switching a status of the charging cover when the collected image is successfully matched with the pre-stored set gesture image;

wherein the status of the charging cover comprises an open status and a closed status;

wherein after the collected image is successfully matched with the pre-stored set gesture image and before switching the status of the charging cover, further comprises:

detecting a distance between an object in the vicinity of the charging cover and the charging cover;

determining whether the distance between the object in the vicinity of the charging cover and the charging cover is greater than or equal to a predetermined safe distance; and determining whether there is a charging device connected to a current charging stand, when the distance between the object in the vicinity of the charging cover and the charging cover is greater than or equal to the predetermined safe distance; and the switching the status of the charging cover comprises switching the status of the charging cover when there is no charging device connected to the current charging stand.

2. The method for charging cover control according to claim 1, wherein the switching the status of the charging cover comprises:

determining the status of the current charging cover;

switching the charging cover to the closed status when the current charging cover is in the open status; and switching the charging cover to the open status when the current charging cover is in the closed status.

3. The method for charging cover control according to claim 1, further comprising:

keeping a current status of the charging cover when the distance between the object in the vicinity of the charging cover and the charging cover is less than the predetermined safe distance.

4. The method for charging cover control according to claim 3, wherein the keeping the current status of the charging cover when the distance between the object in the vicinity of the charging cover and the charging cover is less than the predetermined safe distance comprises:

keeping the current status of the charging cover when the distance between the object in the vicinity of the charging cover and the charging cover is less than the predetermined safe distance, and sending a first prompt message indicating that there is a shielding object in the vicinity of the charging cover.

5. The method for charging cover control according to claim 1, further comprising:

keeping a current status of the charging cover when the charging device is connected to the current charging stand.

6. The method for charging cover control according to claim 5, wherein the keeping the current status of the charging cover when the charging device is connected to the current charging stand comprises:

keeping the current status of the charging cover when the charging device is connected to the current charging stand, and sending a second prompt message indicating that the charging device has been connected to the current charging stand.

7. The method for charging cover control according to claim 1, wherein the detecting the distance between the object in the vicinity of the charging cover and the charging cover comprises:

emitting light with a set wavelength to the vicinity of the charging cover;

receiving light with the set wavelength reflected by the object in the vicinity of the charging cover; and determining the distance between the object in the vicinity of the charging cover and the charging cover based on time taken from emitting to receiving the light with the set wavelength and a light velocity.

8. The method for charging cover control according to claim 1, wherein the detecting a connection status of the current charging stand comprises:

detecting a voltage signal of a first connection confirmation point in the current charging stand;

determining that no charging device is connected to the current charging stand when the voltage signal of the first connection confirmation point is 0; and determining that the charging device is connected to the current charging stand when the voltage signal of the first connection confirmation point is not 0.

9. The method for charging cover control according to claim 1, wherein there are a plurality of the pre-stored set gesture image, and the matching the collected image with the pre-stored set gesture image comprises:

matching the collected image with each of the pre-stored set gesture image;

determining that gesture matching is successful when at least one first similarity between the collected image and at least one of the pre-stored set gesture image is greater than or equal to a preset threshold; and determining that the gesture matching is failed when at least one second similarity between the collected image and each of the pre-stored set gesture image is less than the preset threshold.

10. The method for charging cover control according to claim 1, wherein the biological signal comprises an infrared signal.

* * * * *